United States Patent
Hamamoto et al.

(10) Patent No.: US 6,881,522 B2
(45) Date of Patent: Apr. 19, 2005

(54) NONAQUEOUS ELECTROLYTIC SOLUTION AND LITHIUM SECONDARY BATTERY

(75) Inventors: Toshikazu Hamamoto, Yamaguchi (JP); Koji Abe, Yamaguchi (JP); Yoshihiro Ushigoe, Yamaguchi (JP); Yasuo Matsumori, Yamagauchi (JP)

(73) Assignee: Ube Industries, Ltd. (JP)

( * ) Notice: Subject to any disclaimer, the term of this patent is extended or adjusted under 35 U.S.C. 154(b) by 0 days.

(21) Appl. No.: 10/344,321

(22) PCT Filed: Aug. 13, 2001

(86) PCT No.: PCT/JP01/06975

§ 371 (c)(1),
(2), (4) Date: Jun. 17, 2003

(87) PCT Pub. No.: WO02/15319

PCT Pub. Date: Feb. 21, 2002

(65) Prior Publication Data

US 2004/0058251 A1 Mar. 25, 2004

(30) Foreign Application Priority Data

Aug. 11, 2000 (JP) ......................................... 2000-244131

(51) Int. Cl.$^7$ ................................................. H01M 6/16

(52) U.S. Cl. ..................... 429/332; 429/330; 429/231.1; 429/231.4; 429/231.8

(58) Field of Search ................................. 429/332, 330, 429/231.1, 231.4, 231.8

(56) References Cited

FOREIGN PATENT DOCUMENTS

| JP | 7-37613 A | | 2/1995 |
|---|---|---|---|
| JP | 11-283666 A | | 10/1999 |
| JP | 2000-182666 A | | 6/2000 |
| JP | 2000-188128 | * | 7/2000 |
| JP | 2000-299127 A | | 10/2000 |

* cited by examiner

*Primary Examiner*—Laura Weiner
(74) *Attorney, Agent, or Firm*—Nixon Peabody LLP; Jeffrey L. Costellia

(57) ABSTRACT

A nonaqueous electrolytic solution for lithium secondary batteries. When the nonaqueous solvent comprises a combination of an ester of a tertiary carboxylic acid and a cyclic carbonate such as propylene carbonate or ethylene carbonate, a lithium salt having a fluorine atom is preferably used as the electrolyte salt. In this case, the ester of a tertiary carboxylic acid is preferably used in a relatively small amount, especially in an amount of about 0.5 to 35 wt. % based on the nonaqueous solvent.

17 Claims, No Drawings

NONAQUEOUS ELECTROLYTIC SOLUTION AND LITHIUM SECONDARY BATTERY

FIELD OF INVENTION

The present invention relates to a non-aqueous electrolytic solution which imparts to lithium secondary batteries excellent battery characteristics in battery cycle property, electric capacity and storage property and further relates to a lithium secondary battery containing the same.

BACKGROUND OF INVENTION

At present, a lithium secondary battery is generally employed as an electric source for driving small electronic devices. The lithium secondary battery essentially comprises a positive electrode, a non-aqueous electrolytic solution, separator, and a negative electrode. A lithium secondary battery utilizing a positive electrode of lithium compound oxide such as $LiCoO_2$ and a negative electrode of carbonaceous material or lithium metal is preferably used. As the electrolytic solution, a cyclic carbonate such as ethylene carbonate (EC) or propylene carbonate (PC) is preferably used.

Under the conditions, Japanese Patent Provisional Publication 7-37613 provides an electrolytic solution for lithium secondary batteries that employs an electrolytic solution comprising a combination of a common non-aqueous solvent (e.g., EC, PC) and a non-aqueous tertiary carboxylic ester solvent such as methyl trifluoroacetate (MTFA) or methyl pivalate (MPA), is stable in a voltage range higher than 4 V, and shows high electroconductivity in a temperature range of 0° C. or lower, low reactivity with lithium and long charge-discharge cycle life.

In the Japanese Patent Provisional Publication 7-37613, there are described a negative electrode of glassy carbon and a non-aqueous solvent of a mixture of PC and MTFA, a mixture of EC and MTFA, and a mixture of PC and MPA.

According to the study of the present inventors, however, it has been found that when generally employed carbonaceous material such as natural graphite or artificial graphite, especially highly crystallized carbonaceous material such as highly crystallized natural graphite or artificial graphite, is employed for the formation of a negative electrode in a lithium secondary battery, an electrolytic solution employing the above-mentioned non-aqueous mixture solvent is apt to decompose on the negative electrode to cause increase of irreversible capacity, and further sometimes causes exfoliation of carbonaceous materials. The increase of irreversible capacity and exfoliation of carbonaceous material are caused by decomposition of the solvent in the electrolytic solution at the time of charging and by electrochemical reduction of the solvent on the interface between the carbonaceous material and the electrolytic solution. Particularly, PC (propylene carbonate) having a low melting point and a high permittivity and showing a high electroconductivity even at a low temperature decomposes in the presence of a graphite negative electrode and therefore it cannot be used for a lithium secondary battery. Further, it has been found that EC (ethylene carbonate) also decomposes in portion in the course of repeated charge-discharge procedures so that the battery characteristics lower. It has been furthermore found that since methyl pivalate has a boiling point of 101° C., a non-aqueous solvent comprising 50 wt. % or more of methyl pivalate causes expansion of the battery and lowering of battery characteristics at elevated temperatures.

It is also found that the use of an electrolytic salt of $LiClO_4$ (which is described in the Japanese Patent Provisional Publication 7-37613) in the electrolytic solution causes decomposition of the electrolytic solution to emit gas in the operation of battery at a high temperature and gives harmful effect to cycle property at 0° C. or higher.

Japanese Patent Provisional Publication 12-182670 describes a lithium battery which utilizes as the non-aqueous solution such a compound as ethyl acetate, methyl propionate or methyl butyrate and is employable at low temperatures. The non-aqueous battery described in the Japanese Patent Provisional Publication 12-182670 certainly shows good characteristics at low temperatures. However, a carboxylic acid ester having a structure in which a hydrogen atom is attached to a carbon atom placed adjacent to a carbonyl group, such as ethyl acetate, methyl propionate or methyl butyrate, is apt to produce a gas upon reaction with lithium metal (which is produced on the negative electrode by electrodeposition) and causes lowering of cycle property and lowering of storage endurance, in the case that it is employed in combination with a negative electrode of highly crystallized carbonaceous material such as natural graphite or artificial graphite in a lithium secondary battery. Further, in the case of employing a non-aqueous solvent containing 20 wt. % or more of methyl propionate (boiling temperature: 79° C.), expansion of the battery and lowering of the battery characteristics are observed.

Japanese Patent Provisional Publication 9-27328 describes that a non-aqueous electrolytic solution containing methyl decanoate, dodecyl acetate, or the like easily permeates into a separator, and that the non-aqueous battery utilizing such non-aqueous electrolytic solution shows large battery capacity and high battery voltage, and further shows little fluctuation of battery characteristics. The non-aqueous battery described in the Japanese Patent Provisional Publication 9-27328 certainly shows good permeation into an electrolytic solution into a separator, large battery capacity and high battery voltage. However, in the case that the disclosed electrolytic solution is used in combination with highly crystallized carbonaceous material such as natural graphite or artificial graphite in lithium secondary batteries, the solution may decompose on the negative electrode to cause increase of irreversible capacity and sometimes causes exfoliation of carbonaceous material. The increase of irreversible capacity and exfoliation of carbonaceous material are caused by decomposition of the solvent in the electrolytic solution in the charging process and originate from electrochemical reduction of the solvent on the interface between the carbonaceous material and the electrolytic solution. Particularly, a carboxylic acid ester having a structure in which a hydrogen atom is attached to a carbon atom placed adjacent to a carbonyl group, such as methyl decanoate or dodecyl acetate, is apt to decompose in portion in the course of the repeated charging-discharging procedures and causes lowering of cycle property in the case that the graphite negative electrode is employed.

DISCLOSURE OF INVENTION

It is an object of the present invention to solve the problems observed in the heretofore known electrolytic solutions for lithium secondary batteries and provide a lithium secondary battery which shows good battery cycle property, good electric capacity, good storage endurance in the charged conditions, and further shows little battery expansion in the use at elevated temperatures. The invention further provides a non-aqueous electrolytic solution favorably employable for lithium secondary batteries.

The present inventors have discovered that a fluorine-containing lithium salt is preferably employed as the electrolytic salt when the tertiary carboxylic ester described in the aforementioned Japanese Patent Provisional Publication 7-37613 is employed in combination with a cyclic carbonate such as propylene carbonate or ethylene carbonate. They have further discovered that, in the above-mentioned case, the tertiary carboxylic ester is preferably employed in a relatively small amount, particularly in an amount of 0.5 to 35 weight % in the non-aqueous solvent.

The inventors have furthermore discovered that a tertiary carboxylic acid ester containing an alcohol reside of an alkyl group having 4 or more carbon atoms is highly compatible with a separator comprising polyolefin such as polypropylene or polyethylene and therefore it is favorably employed as a component of non-aqueous solvent for lithium secondary batteries.

Accordingly, the invention resides in a lithium secondary battery which comprises a positive electrode comprising lithium compound oxide, a negative electrode comprising carbonaceous material, a separator, and a non-aqueous electrolytic solution comprising an electrolytic salt in a non-aqueous solvent, in which the electrolytic salt is a fluorine-containing lithium salt and the non-aqueous solvent contains a cyclic carbonate and 0.5 to 35 weight % of a tertiary carboxylic ester having the formula (I):

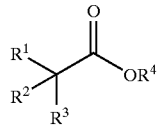

(I)

[wherein each of $R^1$, $R^2$ and $R^3$ independently represents methyl, ethyl, fluorine, or chlorine, and $R^4$ represents a hydrocarbyl group having 1–20 carbon atoms].

The invention further resides in a lithium secondary battery which comprises a positive electrode comprising lithium compound oxide, a negative electrode comprising carbonaceous material, a separator, and a non-aqueous electrolytic solution comprising an electrolytic salt in a non-aqueous solvent, in which the electrolytic salt is a fluorine-containing lithium salt and the non-aqueous solvent contains a cyclic carbonate and 0.5 weight % or more of a tertiary carboxylic ester having the above-mentioned formula (I) [wherein each of $R^1$, $R^2$ and $R^3$ independently represents methyl, ethyl, fluorine, or chlorine, and $R^4$ represents a hydrocarbyl group having 4–20 carbon atoms].

Furthermore, the invention resides in a non-aqueous electrolytic solution for lithium secondary batteries comprising an electrolytic salt in a non-aqueous solvent, in which the electrolytic salt is a fluorine-containing lithium salt and the non-aqueous solvent contains a cyclic carbonate and 0.5 to 35 weight % of a tertiary carboxylic ester having the above-mentioned formula (I) [wherein each of $R^1$, $R^2$ and $R^3$ independently represents methyl, ethyl, fluorine, or chlorine, and $R^4$ represents a hydrocarbyl group having 1–20 carbon atoms].

Furthermore, the invention resides in a non-aqueous electrolytic solution comprising an electrolytic salt in a non-aqueous solvent, in which the electrolytic salt is a fluorine-containing lithium salt and the non-aqueous solvent contains a cyclic carbonate and 0.5 weight % or more of a tertiary carboxylic ester having the above-mentioned formula (I) [wherein each of $R^1$, $R^2$ and $R^3$ independently represents methyl, ethyl, fluorine, or chlorine, and $R^4$ represents a hydrocarbyl group having 4–20 carbon atoms].

DETAILED DESCRIPTION OF INVENTION

In the aforementioned formula (I) for the tertiary carboxylic acid ester to be incorporated into an electrolytic solution in which an electrolytic salt is dissolved in a non-aqueous solvent, it is preferred that each of $R^1$, $R^2$ and $R^3$ independently is methyl or ethyl. $R^4$ preferably is an alkyl group having 1–20 carbon atoms such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, or eicosanyl. The alkyl group may be a branched alkyl group such as isopropyl, isobutyl, isopentyl, sec-butyl, tert-butyl, isooctyl, sec-octyl, 2-ethylhexyl, isononyl, isodecyl, or isooctadecyl. Further, an unsaturated hydrocarbyl group such as vinyl, allyl, or propargyl can be employed. Furthermore, an aryl group such as phenyl, tolyl or biphenyl, or a benzyl group can be employed.

Examples of the tertiary carboxylic esters of the formula (I) include methyl pivalate ($R^1=R^2=R^3=R^4$=methyl), ethyl pivalate. ($R^1=R^2=R^3$=methyl, $R^4$=ethyl), propyl pivalate ($R^1=R^2=R^3$=methyl, $R^4$=n-propyl), isopropyl pivalate ($R^1=R^2=R^3$=methyl, $R^4$=isopropyl), butyl pivalate ($R^1=R^2=R^3$=methyl, $R^4$=n-butyl), sec-butyl pivalate ($R^1=R^2=R^3$=methyl, $R^4$=sec-butyl), isobutyl pivalate ($R^1=R^2=R^3$=methyl, $R^4$=isobutyl), tert-butyl pivalate ($R^1=R^2=R^3$=methyl, $R^4$=tert-butyl), octyl pivalate ($R^1=R^2=R^3$=methyl, $R^4$=n-octyl), sec-octyl pivalate ($R^1=R^2=R^3$=methyl, $R^4$=sec-octyl), nonyl pivalate ($R^1=R^2=R^3$=methyl, $R^4$=n-nonyl), decyl pivalate ($R^1=R^2=R^3$=methyl, $R^4$=n-decyl), undecyl pivalate ($R^1=R^2=R^3$=methyl, $R^4$=n-undecyl), dodecyl pivalate ($R^1=R^2=R^3$=methyl, $R^4$=n-dodecyl), vinyl pivalate ($R^1=R^2=R^3$=methyl, $R^4$=vinyl), allyl pivalate ($R^1=R^2=R^3$=methyl, $R^4$=allyl), propargyl pivalate ($R^1=R^2=R^3$=methyl, $R^4$=propargyl), phenyl pivalate ($R^1=R^2=R^3$=methyl, $R^4$=phenyl), p-tolyl pivalate ($R^1=R^2=R^3$=methyl, $R^4$=p-tolyl), biphenyl pivalate ($R^1=R^2=R^3$=methyl, $R^4$=biphenyl), benzyl pivalate ($R^1=R^2=R^3$=methyl, $R^4$=benzyl), methyl 2,2-dimethylbutanoate ($R^1=R^2=R^4$=methyl, $R^3$=ethyl), methyl 2-ethyl-2-methylbutanoate ($R^1=R^4$=methyl, $R^2=R^3$=ethyl), and methyl 2,2-diethylbutanoate ($R^1=R^2=R^3$=ethyl, $R^4$=methyl).

The tertiary carboxylic ester employed in the invention is not limited to the above-mentioned examples. Various combinations can be employed in consideration of the gist of the invention.

As is described hereinbefore, if the tertiary carboxylic ester of the formula (I) is contained in the electrolytic solution in an excessively large amount, the electroconductivity of the electrolytic solution may vary, while if it is contained in an extremely small amount, the expected battery characteristics can be obtained. Accordingly, the amount of the tertiary carboxylic ester preferably is in the range of 0.5 to 35 weight %, particularly in the range of 1 to 20 weight %.

The non-aqueous solvent used in the invention necessarily contains the tertiary carboxylic ester and a cyclic carbonate. It is preferred that a linear carbonate is added to the solvent.

Examples of the cyclic carbonates include ethylene carbonate (EC), propylene carbonate (PC), butylene carbonate (BC), and vinylene carbonate (VC). These cyclic carbonates can be used singly or in combination.

Examples of the linear carbonates include dimethyl carbonate (DMC), diethyl carbonate (DEC), ethyl methyl carbonate (EMC), methyl propyl carbonate (MPC), isopropyl methyl carbonate (IPMC), butyl methyl carbonate (BMC), isobutyl methyl carbonate (IBMC), sec-butyl methyl carbonate (SBMC), and tert-butyl methyl carbonate (TMBC). These linear carbonates can be used singly or in combination.

An optionally selected cyclic carbonate and an optionally selected linear carbonate can be employed in combination. The non-aqueous solvent preferably contains a cyclic carbonate in an amount of 10 to 80 weight %. If a linear carbonate is employed in combination, its amount preferably is not more than 80 weight %.

The non-aqueous solvent of the invention can further contain a cyclic ester. Preferred examples of the cyclic esters include γ-butyrolactone (GEL) and γ-valerolactone (GVL). The cyclic esters can be employed singly or in combination. If the cyclic ester is contained in the non-aqueous solvent, its amount preferably is not more than 70 weight %, particularly in the range of 30 to 70 weight %. Since the cyclic ester has a high flash point, the incorporation of the cyclic ester into an electrolytic solution enhances safety of a lithium secondary battery.

The electrolytic salt to be incorporated into the electrolytic solution of the invention is a fluorine atom-containing lithium salt. Preferred examples of the fluorine-containing lithium salts include $LiPF_6$, $LiBF_4$, $LiAsF_6$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$. These electrolytes can be employed singly or in combination. Generally, the electrolyte can be incorporated into the non-aqueous solvent in such an amount to give an electrolytic solution of 0.1 M to 3 M, preferably 0.5 M to 2 M.

The electrolytic solution can be prepared, for instance, by mixing the above-mentioned cyclic carbonate and linear carbonate (if desired, a cyclic ester is further mixed); dissolving a tertiary carboxylic ester of the formula (I) in the mixture; and further dissolving the aforementioned electrolytic fluorine-containing lithium salt in the mixture solution.

The electrolytic solution of the invention is favorably employable for manufacture of lithium secondary battery.

The positive electrode to be employed in a lithium secondary battery according to the invention comprises a lithium compound metal oxide. Positive electrode materials (active materials of positive electrode) are compound oxides of lithium and at least one metal selected from the group consisting of cobalt, manganese, nickel, chromium, iron, and vanadium. Examples of the compound metal oxides include $LiCoO_2$, $LiMn_2O_4$, and $LiNiO_2$. Further, a compound metal oxide of lithium with a mixture of cobalt and manganese and a compound metal oxide of lithium with a mixture of cobalt and nickel are employable.

The positive electrode can be manufactured by kneading the above-mentioned positive material, an electro-conductive material such as acetylene black or carbon black, and a binder such as poly(tetrafluoroethylene) (PTFE), poly (vinylidene fluoride) (PVDF), styrene-butadiene copolymer (SBR), acrylonitrile-butadiene copolymer (NBR) or carboxymethylcellulose (CMC) to give a positive electrode composition; coating the positive electrode composition on a collector such as aluminum foil, stainless foil, or lath plate; drying the coated composition; pressing the dried composition; and heating the pressed composition in vacuo at a temperature of approximately 50 to 250° C. for approximately 2 hours.

As the negative electrode active material, carbonaceous material having a graphite crystal structure (e.g., thermally decomposed carbonaceous material, coke, graphites such as artificial graphite and natural graphite, fired organic polymer, and carbon fiber) which can absorb and release lithium. It is preferred to employ carbonaceous materials having a graphite crystal structure in which the lattice distance of lattice surface (002), namely, $d_{002}$, is in the range of 0.335 to 0.340 nm (nanometer). The negative electrode active material in the powdery form such as carbonaceous powder is preferably used in combination with a binder such as ethylene propylene diene terpolymer (EPDM), polytetrafluoro-ethylene (PTFE), poly(vinylidene fluoride) (PVDF), styrene-butadiene copolymer (SBR), acrylonitrile-butadiene copolymer (NBR) or carboxymethylcellulose (CMC).

Preferred separators are microporous separators of polyethylene such as polypropylene and polyethylene. Separators made of other materials such as woven fabrics and non-woven fabrics are also employable There are no specific limitations with respect to the structure of the non-aqueous secondary battery of the invention. For instance, the non-aqueous secondary battery can be a battery of coin type comprising a positive electrode, a negative electrode, and single or plural separators, or a cylindrical or prismatic battery comprising a positive electrode, a negative electrode, and a separator roll.

The examples and comparison examples are given below.

EXAMPLE 1

1) Preparation of Non-aqueous Electrolytic Solution

In a non-aqueous mixture of EC (ethylene carbonate), DEC (diethyl carbonate) and methyl pivalate (compound of the formula (I) in which each of $R^1$, $R^2$, $R^3$, and $R^4$ is methyl) [weight ratio 30:60:10] was dissolved $LiPF_6$ to give a non-aqueous electrolytic solution of 1M concentration.

2) Manufacture Lithium Secondary Battery and Measurement of its Battery Characteristics $LiCoO_2$ (positive electrode active material, 80 wt. %), acetylene black (electro-conductive material, 10 wt. %), and poly(vinylidene fluoride) (binder, 10 wt. %) were mixed. To the resulting mixture was further added 1-methyl-2-pyrrolidone. Thus produced mixture was coated on aluminum foil, dried, pressed, and heated to give a positive electrode.

Artificial graphite (negative electrode active material, 90 wt. %) and poly(vinylidene fluoride) (binder, 10 wt. %) were mixed. To the resulting mixture was further added 1-methyl-2-pyrrolidone. Thus produced mixture was coated on copper foil, dried, pressed, and heated to give a negative electrode.

The positive and negative electrodes, a microporous polypropylene film separator, and the above-mentioned non-aqueous electrolytic solution were combined to give a coin-type battery (diameter: 20 mm, thickness: 3.2 mm).

The coin-type battery was charged at roan temperature (20° C.) with a constant electric current (0.8 mA) to reach 4.2 V for 5 hours. Subsequently, the battery was discharged to give a constant electric current (0.8 mA) to give a terminal voltage of 2.7 V. The charge-discharge cycle was repeated.

The initial discharge capacity was almost the same as the capacity measured in a battery using an 1M $LiPF_4$ and EC/DEC (30/70, weight ratio) solvent mixture (containing no additive) [see Comparison Example 3].

After the 50 cycle charge-discharge procedure, the retention of discharge capacity was 90.7% of the initial discharge capacity (100%). Further, various characteristics at low temperatures and high temperatures were satisfactory.

The manufacturing conditions and the battery characteristics are shown in Table 1.

EXAMPLES 2 TO 11

The procedures of Example 1 were repeated except for varying the conditions as set forth in Table 1, to manufacture coin batteries. The manufactured coin batteries were subjected to measurement of retention of discharge capacity after 50 cycles. The results are set forth in Table 1.

COMPARISON EXAMPLES 1 TO 5

The procedures of Example 1 were repeated except for varying the conditions as set forth in Table 1, to manufacture coin batteries. The manufactured coin batteries were subjected to measurement of retention of discharge capacity after 50 cycles. The results are set forth in Table 1.

EXAMPLE 12

The procedures of Example 1 were repeated except for employing a non-aqueous solvent of EC/PC (propylene carbonate)/DEC/octyl pivalate (35/35/25/5, weight ratio) and a negative electrode of coke, to manufacture a coin battery. The manufactured coin battery was subjected to measurement of retention of discharge capacity after 50 cycles. The retention of discharge capacity was 86.5% of the initial discharge capacity (100%).

The manufacturing conditions and the battery characteristics are shown in Table 1.

COMPARISON EXAMPLE 6

The procedures of Example 12 were repeated except for employing a non-aqueous solvent of EC/PC/methyl octanoate (49/49/2, weight ratio), to manufacture a coin battery. The manufactured coin battery was subjected to measurement of retention of discharge capacity after 50 cycles. The retention of discharge capacity was 71.3% of the initial discharge capacity (100%).

The manufacturing conditions and the battery characteristics are shown in Table 1.

EXAMPLE 13

The procedures of Example 1 were repeated except for using a non-aqueous solvent of EC/GBL (γ-butyrolactone)/IBMC (isobutyl methyl carbonate)/DEC/octyl pivalate (25/50/20/5, weight ratio) in which 1.2M LiBF$_4$ and a positive electrode of LiMn$_2$O$_4$, to manufacture a coin battery. The manufactured coin battery was subjected to measurement of retention of discharge capacity after 50 cycles.

The retention of discharge capacity was 83.4% of the initial discharge capacity (100%).

The manufacturing conditions and the battery characteristics are shown in Table 1.

EXAMPLE 14

The procedures of Example 13 were repeated except for employing a non-aqueous solvent of EC/GBL/IBMC/decyl pivalate (25/50/20/5, weight ratio), to manufacture a coin battery. The manufactured coin battery was subjected to measurement of retention of discharge capacity after 50 cycles. The retention of discharge capacity was 82.1% of the initial discharge capacity (100%).

The manufacturing conditions and the battery characteristics are shown in Table 1.

EXAMPLE 15

The procedures of Example 13 were repeated except for employing a non-aqueous solvent of EC/GBL/IBMC/dodecyl pivalate (25/50/20/5, weight ratio), to manufacture a coin battery. The manufactured coin battery was subjected to measurement of retention of discharge capacity after 50 cycles. The retention of discharge capacity was 81.7% of the initial discharge capacity (100%).

The manufacturing conditions and the battery characteristics are shown in Table 1.

COMPARISON EXAMPLE 7

The procedures of Example 13 were repeated except for employing a non-aqueous solvent of EC/GEL (30/70, weight ratio), to manufacture a coin battery. The manufactured coin battery was subjected to measurement of retention of discharge capacity after 50 cycles. The retention of discharge capacity was 67.4% of the initial discharge capacity (100%4).

The manufacturing conditions and the battery characteristics are shown in Table 1.

TABLE 1

| Example | Posi. Elec. | Nega. Elec. | Li salt (M) | Cyclic (wt. %) | Linear (wt. %) | Additive (wt. %) | Retent. (%) |
|---|---|---|---|---|---|---|---|
| 1 | LiCoO$_2$ | Art. | LiPF$_6$ 1M | EC 30 | DEC 60 | M.pivalate 10 | 90.7 |
| 2 | LiCoO$_2$ | Art. | LiPF$_6$ 1M | EC 30 | DEC 50 | M.pivalate 20 | 91.8 |
| 3 | LiCoO$_2$ | Art. | LiPF$_6$ 1M | EC 30 | DEC 40 | M.pivalate 30 | 91.4 |
| 4 | LiCoO$_2$ | Art. | LiPF$_6$ 1M | EC 30 | DEC 30 | M.pivalate 40 | 85.9 |
| 1 (Com.) | LiCoO$_2$ | Art. | LiClO$_4$ 1M | EC 50 | None | M.pivalate 50 | 65.5 |
| 2 (Com.) | LiCoO$_2$ | Art. | LiClO$_4$ 1M | PC 50 | None | M.pivalate 50 | Fail |
| 3 (Com.) | LiCoO$_2$ | Art. | LiPF$_6$ 1M | EC 30 | DEC 70 | None | 81.7 |
| 5 | LiCoO$_2$ | Art. | LiPF$_6$ 1M | EC/PC 30/5 | DEC 50 | E.pivalate 15 | 91.6 |
| 6 | LiCoO$_2$ | Art. | LiPF$_6$ 1M | EC/PC/VC 27/5/3 | DMC/EMC 15/40 | M.pivalate 10 | 92.1 |
| 7 | LiCoO$_2$ | Art. | LiPF$_6$ | EC/PC/VC 27/5/3 | DMC/IPMC 15/40 | M.pivalate 10 | 91.9 |
| 8 | LiMn$_2$O$_4$ | Art. | LiPF$_6$ | EC/PC 30/5 | DEC 50 | M.pivalate 15 | 92.1 |

TABLE 1-continued

| Example | Posi. Elec. | Nega. Elec. | Li salt (M) | Cyclic (wt. %) | Linear (wt. %) | Additive (wt. %) | Retent. (%) |
|---|---|---|---|---|---|---|---|
| 4 (Com.) | $LiCoO_2$ | Art. | $LiPF_6$ 1M | EC/VC 15/5 | DMC 23 | E.acetate 57 | 81.1 |
| 9 | $LiCoO_2$ | Art. | $LiPF_6$/ $LiBF_4$ 0.9M/0.1M | EC/PC/VC 27/5/3 | DEC 45 | M.pivalate 20 | 91.3 |
| 10 | $LaCoO_2$ | Art. | $LiPF_6$/ $LiN(SO_2CF_3)_2$ 0.9M/0.1M | EC/PC/VC 27/5/3 | DEC 45 | M.pivalate 20 | 91.6 |
| 11 | $LiCoO_2$ | Art. | $LiPF_6$ | EC/PC/VC 35/35/5 | DEC 20 | O.pivalate 5 | 90.4 |
| 5 (Com.) | $LiCoO_2$ | Art. | $LiPF_6$ 1M | EC/PC 49/49 | None | M.octanoate 2 | Fail |
| 12 | $LiCoO_2$ | Coke | $LiPF_6$ 1M | EC/PC 35/35 | DEC 25 | O.pivalate 5 | 86.5 |
| 6 (Com.) | $LiCoO_2$ | Coke | $LiPF_6$ 1M | EC/PC 49/49 | None | M.octanoate 2 | 71.3 |
| 13 | $LiMn_2O_4$ | Art. | $LiBF_4$ 1.2M | EC/GBL 25/50 | IBMC 20 | O.pivalate 5 | 83.4 |
| 14 | $LiMn_2O_4$ | Art. | $LiBF_4$ 1.2M | EC/GBL 25/50 | IBMC 20 | D.pivalate 5 | 82.1 |
| 15 | $LiMn_2O_4$ | Art. | $LiBF_4$ 1.2M | EC/GBL 25/50 | IBMC 20 | DD.pivalate 5 | 81.7 |
| 7 (com.) | $LiMn_2O_4$ | Art. | $LiBF_4$ 1.2M | EC/GBL 30/70 | None | None | 67.4 |

Remarks:
Art.: Artificial graphite,
Cyclic: Cyclic carbonate or cyclic ester
Linear: Linear carbonate
M.pivalate: Methyl pivalate
E.pivalate: Ethyl pivalate
O.pivalate: Octyl pivalate
D.pivalate: Decyl pivalate
DD.pivalate: Dodecyl pivalate
Additive: Tertiary carbonic ester or other esters
Retent.: Retention of discharge capacity after 50 cycles
Fail: Failure of charge-discharge cycle From the results set forth in Table 1, it is understood that a lithium secondary battery employing a positive electrode of lithium compound oxide material, a negative electrode of carbonaceous material, and an electrolytic salt of a fluorine-containing lithium salt shows a high discharge capacity retention when such a small amount as 35 weight % or less of a tertiary carboxylic ester of the formula (I), particularly pivalic ester, is added to a non-aqueous solvent comprising a cyclic carbonate and a linear carbonate.

COMPARISON EXAMPLE 8

The procedures of Example 1 were repeated except for employing a non-aqueous solvent of plural cyclic carbonates (EC/PC/VC) containing no a linear carbonate, to manufacture a coin battery. The manufactured coin battery was subjected to measurements of an initial discharge capacity and a retention of discharge capacity after 50 cycles. The initial discharge capacity is 0.45 (relative value which is obtained when the initial discharge capacity in the aforementioned Comparison Example 3 is set to 1). The retention of discharge capacity was 15.2% of the initial discharge capacity (100%). The manufacturing conditions and the battery characteristics are shown in Table 2.

EXAMPLE 16

The procedures of Example 1 were repeated except for employing a non-aqueous solvent of a mixture of plural cyclic carbonates and pivalic ester (EC/PC/VC/methyl pivalate=45/45/5/5, weight ratio) containing no a linear carbonate, to manufacture a coin battery. The manufactured coin battery was subjected to measurements of an initial discharge capacity and a retention of discharge capacity after 50 cycles. The initial discharge capacity is 0.91 (relative value which is obtained when the initial discharge capacity in the aforementioned Comparison Example 3 is set to 1). The retention of discharge capacity was 89.1% of the initial discharge capacity (100%). The manufacturing conditions and the battery characteristics are shown in Table 2.

EXAMPLES 17 TO 21

The procedures of Example 16 were repeated except for replacing methyl pivalate with ethyl pivalate (Example 17), butyl pivalate (Example 18), hexyl pivalate (Example 19), octyl pivalate (Example 20), decyl pivalate (Example 21), or dodecyl pivalate (Example 22), to manufacture a coin battery. The manufactured coin batteries were subjected to measurements of an initial discharge capacity and a retention of discharge capacity after 50 cycles. The results are shown in Table 2.

TABLE 2

| Example | Posi. Elec. | Nega. Elec. | Li salt (M) | Cyclic (wt. %) | Additive (wt. %) | Initial | Retent. (%) |
|---|---|---|---|---|---|---|---|
| 16 | $LiCoO_2$ | Art. | $LiPF_6$ 1M | EC/PC/VC 45/45/5 | M.pivalate 5 | 0.91 | 89.1 |
| 17 | $LiCoO_2$ | Art. | $LiPF_6$ 1M | EC/PC/VC 45/45/5 | E.pivalate 5 | 0.95 | 89.5 |
| 18 | $LiCoO_2$ | Art. | $LiPF_6$ 1M | EC/PC/VC 45/45/5 | B.pivalate 5 | 1.00 | 90.4 |
| 19 | $LiCoO_2$ | Art. | $LiPF_6$ 1M | EC/PC/VC 45/45/5 | H.pivalate 5 | 1.01 | 90.8 |
| 20 | $LiCoO_2$ | Art. | $LiPF_6$ 1M | EC/PC/VC 45/45/5 | O.pivalate 5 | 1.00 | 90.5 |
| 21 | $LiCoO_2$ | Art. | $LiPF_6$ 1M | EC/PC/VC 45/45/5 | D.pivalate 5 | 1.00 | 90.4 |
| 22 | $LiCoO_2$ | Art. | $LiPF_6$ 1M | EC/PC/VC 45/45/5 | DD.pivalate 5 | 0.99 | 90.1 |
| 8 (Com.) | $LiCoO_2$ | Art. | $LiPF_6$ 1M | EC/PC/VC 47.5/47.5/5 | None | 0.45 | 15.2 |

Remarks:
No linear carbonate was contained in any of Examples 16 to 22 and Comparison Example 8
Initial:
Initial discharge capacity From the results set forth in Table 2, it is understood that a lithium secondary battery employing a positive electrode of lithium compound oxide material, a negative electrode of carbonaceous material, and an electrolytic salt of a fluorine-containing lithium salt shows a high discharge capacity retention when such a small amount as 35 weight % or less of a tertiary carboxylic ester of the formula (I), particularly pivalic ester, is added to a non-aqueous solvent comprising a cyclic carbonate. It is further understood that generally the initial discharge capacity greatly decreases when no linear carbonate is added to the non-aqueous solvent (Comparison Example 8), while the decrease of initial discharge capacity prominently lowers and the discharge capacity retention apparently increases when a small amount of a tertiary carboxylic ester of the formula (I), particularly pivalic ester, is added in place of the linear carbonate.

It is furthermore noted that the initial discharge capacity reaches a level equal to that shown in the case of using a linear carbonate and a high discharge capacity retention is observed when the alcohol residue ($R^4$) of the tertiary carboxylic ester of the formula (I) is an alkyl group having 4 or more carbon atoms.

EXAMPLE 22

Permeability of an electrolytic solution into pores of a microporous separator to be used in a lithium secondary battery was evaluated in the below-mentioned manner.

An electrolytic solution was prepared by adding 2 or 4 weight parts of a pivalic ester to 100 weight parts of 1M $LiPF_6$/PC electrolytic salt solution. In the electrolytic solution was immersed for a period of 20 seconds a separator of polypropylene microporous film (trademark: CELGARD #2500, available from CELGARD Inc.). The separator was then taken out and its light permeability was observed. The results are set forth in Table 3.

TABLE 3

| Amount (parts) | Ethyl pivalate | Butyl pivalate | Hexyl pivalate | Octyl pivalate | Dodecyl pivalate |
|---|---|---|---|---|---|
| 2 | opaque | S-T. | A.T. | F.T. | F.T. |
| 4 | S-T. | A.T. | F.T. | F.T. | F.T. |

Remarks:
S-T.: semitransparent
A.T.: almost transparent
F.T.: fully transparent

From the results in Table 3, it is understood that a pivalic ester whose alcohol residue is an alkyl group having 4 or more carbon atoms shows compatibility with a separator higher than that shown by ethyl pivalate whose alcohol residue is an alkyl group having 2 carbon atoms and, when it is placed in contact with a microporous separator, rapidly permeates into a porous structure of the separator. This means that the period of time for manufacturing a lithium secondary battery can be shortened. In more detail, the lithium secondary battery is manufactured by mounting a composite of a positive electrode sheet, a separator, and a negative electrode sheet in a battery case, placing an electrolytic solution in the case, and fixing a cap aver the case. The fixation of a cap over the case ought to be done after the electrolytic solution completely replaces air occupying the micro-porous structure of the separator. Accordingly, the use of an electrolytic solution which is able to quickly permeate into a microporous structure of a separator shortens the period of time for manufacturing lithium secondary batteries.

The present invention is not limited to the working examples described herein, and various combinations apparent from the gist of the invention can be employed. Particularly, the invention is not limited to the combinations of solvents shown in the working examples. Further, it should be noted that although the above-stated working examples are for a coin battery, the present invention can be employed for cylindrical and prismatic batteries and polymer batteries.

UTILIZATION IN INDUSTRY

The use of a nonaqueous electrolytic solution of the invention in the manufacture of a lithium secondary battery provides a lithium secondary battery that is excellent in battery characteristics such as its battery cycle property, electric capacity and stability endurance under charged condition, and further is essentially free from its expansion in the use at elevated temperatures.

What is claimed is:

1. A lithium secondary battery which comprises a positive electrode comprising lithium compound oxide, a negative electrode comprising carbonaceous material, a separator, and a non-aqueous electrolytic solution comprising an electrolytic salt in a non-aqueous solvent, in which the electrolytic salt is a fluorine-containing lithium salt and the non-aqueous solvent contains a cyclic carbonate and 0.5 to 35 weight % of a tertiary carboxylic ester having the formula (I):

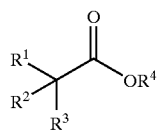
(I)

wherein each of $R^1$, $R^2$ and $R^3$ independently represents methyl, ethyl, or fluorine, and $R^4$ represents a hydrocarbyl group having 1–20 carbon atoms selected from the group consisting of an alkyl group, vinyl, allyl, propargyl, aryl group, and benzyl.

2. The lithium secondary battery of claim 1, in which the electrolytic salt is selected from the group consisting of $LiPF_6$, $LiBF_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$.

3. The lithium secondary battery of claim 1, in which the cyclic carbonate is contained in the non-aqueous solvent in an amount of 10 to 80 weight %.

4. The lithium secondary battery of claim 1, in which the cyclic carbonate is selected from the group consisting of ethylene carbonate, propylene carbonate, butylene carbonate and vinylene carbonate.

5. The lithium secondary battery of claim 1, in which the non-aqueous solvent further contains a linear carbonate in an amount of 80 weight % or less.

6. The lithium secondary battery of claim 1, in which the tertiary carboxylic ester is contained in the non-aqueous solvent in an amount of 1 to 20 weight %.

7. The lithium secondary battery of claim 1, in which the negative electrode comprises natural or artificial graphite.

8. The lithium secondary battery of claim 1, in which $R^4$ of the formula (I) is an alkyl group having 4–20 carbon atoms.

9. A lithium secondary battery which comprises a positive electrode comprising lithium compound oxide, a negative electrode comprising carbonaceous material, a separator, and a non-aqueous electrolytic solution comprising an electrolytic salt in a non-aqueous solvent, in which the electrolytic salt is a fluorine-containing lithium salt and the non-aqueous solvent contains a cyclic carbonate and 0.5 weight % or more of a tertiary carboxylic ester having the formula (I):

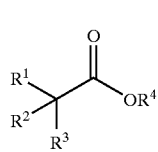
(I)

wherein each of $R^1$, $R^2$ and $R^3$ independently represents methyl, ethyl, or fluorine, and $R^4$ represents a hydrocarbyl group having 1–20 carbon atoms selected from the group consisting of an alkyl group, vinyl, allyl, propargyl, aryl group, and benzyl.

10. A non-aqueous electrolytic solution for lithium secondary batteries comprising an electrolytic salt in a non-aqueous solvent, in which the electrolytic salt is a fluorine-containing lithium salt and the non-aqueous solvent contains a cyclic carbonate and 0.5 to 35 weight % of a tertiary carboxylic ester having the formula (I):

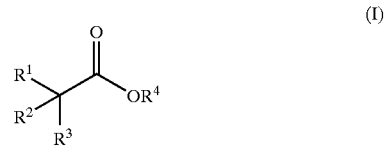
(I)

wherein each of $R^1$, $R^2$ and $R^3$ independently represents methyl, ethyl, or fluorine, and $R^4$ represents a hydrocarbyl group having 1–20 carbon atoms selected from the group consisting of an alkyl group, vinyl, allyl, propargyl, an aryl group, and benzyl.

11. The non-aqueous electrolytic solution of claim 10, in which the electrolytic salt is selected from the group consisting of $LiPF_6$, $LiBF_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$.

12. The non-aqueous electrolytic solution of claim 10, in which the cyclic carbonate is contained in the non-aqueous solvent in an amount of 10 to 80 weight %.

13. The non-aqueous electrolytic solution of claim 10, in which the cyclic carbonate is selected from the group consisting of ethylene carbonate, propylene carbonate, butylene carbonate and vinylene carbonate.

14. The non-aqueous electrolytic solution of claim 10, in which the non-aqueous solvent further contains a linear carbonate in an amount of 80 weight % or less.

15. The non-aqueous electrolytic solution of claim 10, in which the tertiary carboxylic ester is contained in the non-aqueous solvent in an amount of 1 to 20 weight %.

16. The non-aqueous electrolytic solution of claim 10, in which $R^4$ of the formula (I) is an alkyl a hydrocarbyl group having 4–20 carbon atoms.

17. A non-aqueous electrolytic solution comprising an electrolytic salt in a non-aqueous solvent, in which the electrolytic salt is a fluorine-containing lithium salt and the non-aqueous solvent contains a cyclic carbonate and 0.5 weight % or more of a tertiary carboxylic ester having the formula (I):

(I)

wherein each of $R^1$, $R^2$ and $R^3$ independently represents methyl, ethyl, or fluorine, and $R^4$ represents a hydrocarbyl group having 1–20 carbon atoms selected from the group, consisting of an alkyl group, vinyl, allyl, propargyl, aryl group, and benzyl.

* * * * *